No. 617,825. Patented Jan. 17, 1899.
W. BLAIR.
GATE.
(Application filed Jan. 18, 1898.)
(No Model.)
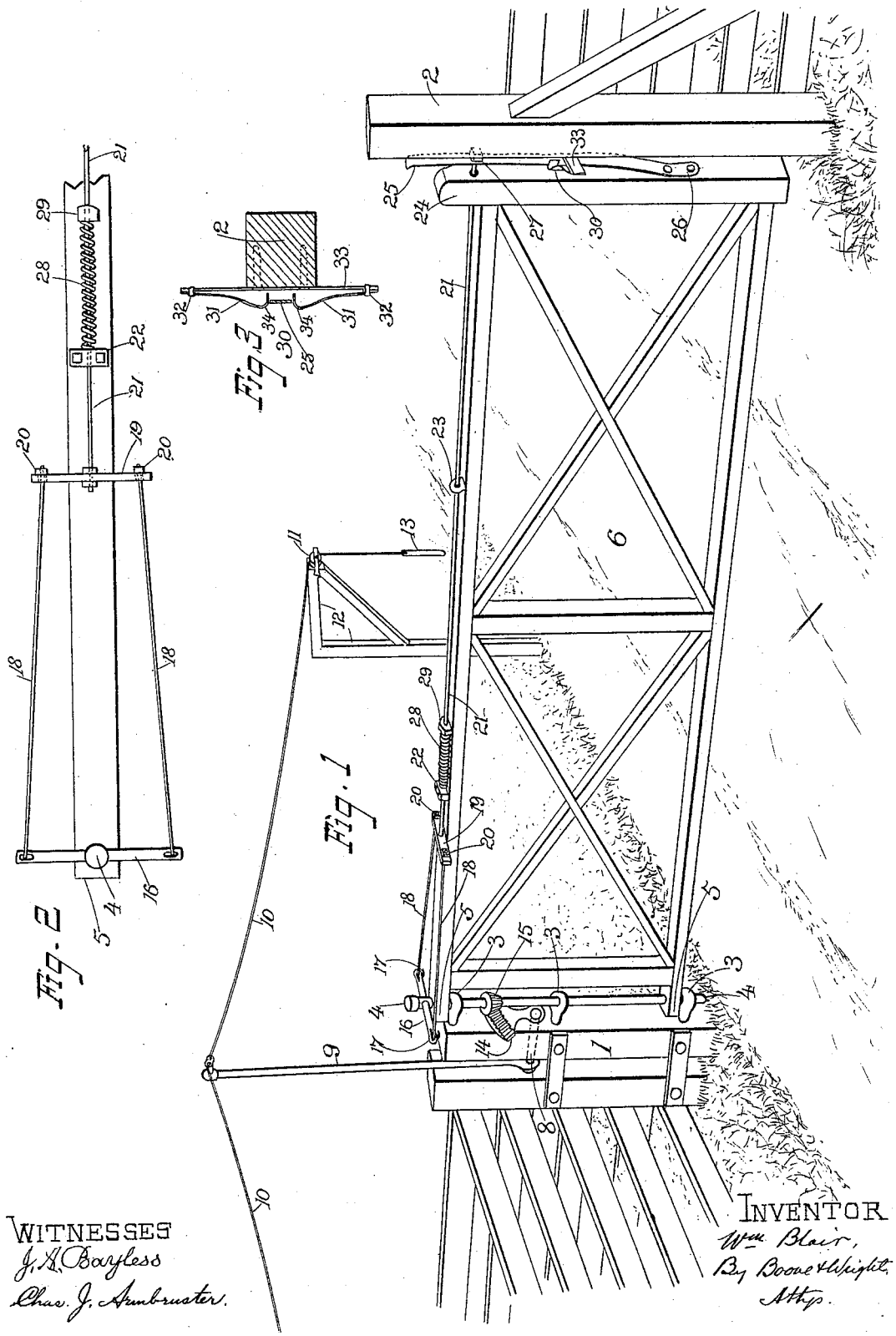
WITNESSES
J. A. Bayless
Chas. J. Armbruster.
INVENTOR
Wm Blair,
By Boone & Wright
Attys.

UNITED STATES PATENT OFFICE.

WILLIAM BLAIR, OF VALLEJO, CALIFORNIA.

GATE.

SPECIFICATION forming part of Letters Patent No. 617,825, dated January 17, 1899.

Application filed January 18, 1898. Serial No. 667,122. (No model.)

*To all whom it may concern:*

Be it known that I, WILLIAM BLAIR, a citizen of the United States, residing at Vallejo, in the county of Solano and State of California, have invented certain new and useful Improvements in Gates; and I do hereby declare the following to be a full, clear, and exact description of said invention, such as will enable others skilled in the art to which it most nearly appertains to make, use, and practice the same.

My invention relates to improvements in gates, the object of my invention being to provide a fence-gate for farms, ranches, and the like which may be opened by a person approaching the gate either side without dismounting from a horse or vehicle and which shall be simple and economical in construction and not liable to get out of order.

In the accompanying drawings, Figure 1 is a perspective view of the apparatus, and Figs. 2 and 3 are enlarged details of certain parts of the apparatus.

1 2 represent the fence-posts, between which the gate is mounted, 1 being the post upon which said gate is hinged, and 2 the post with which the gate engages when closed.

Upon the post 1 are secured stout eyebolts 3, through which is passed a round rod or bar 4, which may very conveniently be made of iron piping. Said bar 4 passes through the upper and lower rear extensions 5 of the gate 6.

Through the post 1 there passes a short shaft 8, the outer end of said shaft carrying a long lever 9, to the upper end of which lever are secured ropes 10, passing over pulleys 11 on the ends of the gallows-frames 12, erected at a suitable distance on each side of the gate. Said ropes are steadied by suitable weights 13, suspended on their ends. Thus by pulling down the rope 10 on one side or the other the lever 9 is vibrated on the shaft 8, thereby vibrating also a segmental rack 14, mounted on the other end of said shaft 8, said rack engaging with and communicating rotation to a pinion 15 on the rod 4, and thus horizontally vibrating the cross-bar 16, secured on the upper end of said rod. To each end of said cross-bar are hooked, as at 17, rods 18, the other ends of which pass loosely through holes in the ends of a bar 19, being secured thereon by nuts 20. To the middle of the bar 19 is secured a rod 21, passing through a guide 22 and an eyebolt 23 on the top bar of the gate and also through the upward extension of the end bar 24 of the gate. The end of the rod 21 also passes loosely through a hole in a spring-latch 25, the latter being secured below to the bar 24, as shown at 26, and being made of a strip of spring metal having a resilient tendency away from the bar 24. Said latch 25 is secured upon the end of the rod 21 by a nut 27. Thus the first effect of vibrating the cross-bar 16 will be by one or the other of the rods 18 to pull the rod 21 in the direction of said cross-bar against the force of the spring 28, which is interposed between the guide 22 and a shoulder 29 on the rod 21. It will thus, first, by means of the rod 21, withdraw the spring-latch 25 out of engagement with the catch 30, which latter comprises two springs 31, each secured at its end at 32 upon the plate 33, bolted upon the post 2, the free end 34 of each spring 31 being curved into a direction perpendicular to the adjacent face of the post, and said free ends having between them a space sufficient for the admission of the latch 25. Since said springs 31 are secured in place independently of each other, either one will yield independently when it is impinged upon by the latch in the swinging of the gate, allowing said latch to pass over the curved portion of said spring so impinged upon, while the movement of said latch will be arrested by the perpendicular face of the other spring which has remained in its normal position. After the latch has been withdrawn, as aforesaid, the further effect of the pull on the lever 9 will be to swing the gate in the direction of the vibration of the cross-bar 16 and open the gate.

I claim—

The combination of a post, a shaft therethrough, a segmental rack on said shaft, a gate, a vertical rod provided with extensions crosswise of the gate, a latch on the gate, a spring-restrained rod for withdrawing said latch, a cross-piece on the end of the rod, said cross-extensions and cross-piece being apertured at their ends, bars hooked through the ends of the extensions and passed through the ends of the cross-piece and screw-threaded at the latter ends, nuts on said screw-threaded ends for adjusting the relative distances of the ends of the cross piece and extensions, a pinion on the vertical rod, engaging the segmental rack, a lever extending vertically upward from said shaft, ropes extending from the end of the lever in both directions from the gate, and supports for said ropes at suitable distances from the gate, substantially as described.

In witness whereof I have hereunto set my hand this 7th day of January, 1898.

WILLIAM BLAIR.

Witnesses:
DAVID HIRSCHLE,
CHAS. J. ARMBRUSTER.